United States Patent
Unterer et al.

(10) Patent No.: US 10,614,571 B2
(45) Date of Patent: Apr. 7, 2020

(54) OBJECT CLASSIFICATION IN DIGITAL IMAGES

(71) Applicant: QIAGEN GMBH, Hilden (DE)

(72) Inventors: Thomas Unterer, Lachen (CH); Guido Schuster, Stüfa (CH)

(73) Assignee: QIAGEN GmbH, Hilden (DE)

( * ) Notice: Subject to any disclaimer, the term of this patent is extended or adjusted under 35 U.S.C. 154(b) by 46 days.

(21) Appl. No.: 16/060,879

(22) PCT Filed: Dec. 9, 2016

(86) PCT No.: PCT/EP2016/080507
§ 371 (c)(1),
(2) Date: Jun. 8, 2018

(87) PCT Pub. No.: WO2017/098010
PCT Pub. Date: Jun. 15, 2017

(65) Prior Publication Data
US 2018/0374212 A1  Dec. 27, 2018

(30) Foreign Application Priority Data

Dec. 10, 2015 (EP) ..................................... 15199401

(51) Int. Cl.
*G06T 7/00* (2017.01)
*G06T 7/11* (2017.01)
(Continued)

(52) U.S. Cl.
CPC ............ *G06T 7/0012* (2013.01); *G06F 19/00* (2013.01); *G06T 7/11* (2017.01); *G06T 7/136* (2017.01);
(Continued)

(58) Field of Classification Search
CPC . G06T 2207/10064; G06T 2207/10152; G06T 2207/30024; G06T 7/0012;
(Continued)

(56) References Cited

U.S. PATENT DOCUMENTS

2008/0015448 A1 * 1/2008 Keely .................. A61B 5/0091
600/477
2009/0226059 A1 * 9/2009 Levenson ................ G01N 1/30
382/128
(Continued)

FOREIGN PATENT DOCUMENTS

WO  WO 2004/045545 A2  6/2004
WO  WO 2008/097455 A1  8/2008
(Continued)

OTHER PUBLICATIONS

International Search Report and Written Opinion of the International Searching Authority directed to related International Patent Application No. PCT/EP2016/080507, dated Aug. 3, 2017; 9 pages.
(Continued)

*Primary Examiner* — Ajibola A Akinyemi
(74) *Attorney, Agent, or Firm* — Sterne, Kessler, Goldstein & Fox P.L.L.C.

(57) ABSTRACT

System and method for distinguishing at least one first object from at least one second object in a plurality of digital images is provided. The at least one first object having received at least one molecule comprising genetic information, the at least one second object not having received a molecule comprising genetic information. The at least one molecule is configured to receive one of a plurality of fluorescent compounds in each of a plurality of cycles. The digital images being determined by an optical imaging system during emission of electromagnetic radiation by the fluorescent compounds, wherein the plurality of digital images comprises a plurality of series of images, each image
(Continued)

of a series referring to the emission spectrum of a respective fluorescent compound and wherein the series of images is repeatedly taken for each of the plurality of cycles.

20 Claims, 4 Drawing Sheets

(51) Int. Cl.
G06T 7/136 (2017.01)
G06F 19/00 (2018.01)
(52) U.S. Cl.
CPC .......... *G06T 2207/10064* (2013.01); *G06T 2207/30072* (2013.01)
(58) Field of Classification Search
CPC . G06T 2207/10056; G06T 2207/20224; G06T 5/50; G06T 7/0016; G06T 7/80; G06T 1/20; G06T 2207/10036; G06T 2207/30004; G06T 2207/30072; G06T 2207/30242; G06T 5/002; G06T 5/006; G06T 7/11; G06T 7/136; G06T 7/194
USPC .......................................... 382/128
See application file for complete search history.

(56) References Cited

U.S. PATENT DOCUMENTS

| 2010/0034453 A1* | 2/2010 | Lynch | G06T 7/0012 382/133 |
| 2010/0035253 A1 | 2/2010 | Gordan et al. | |
| 2010/0285577 A1 | 11/2010 | Izadyar et al. | |
| 2010/0323350 A1 | 12/2010 | Gordan et al. | |
| 2015/0369664 A1* | 12/2015 | Garsha | G01J 3/28 356/402 |
| 2016/0110870 A1* | 4/2016 | Moriyama | G01N 21/6428 382/128 |

FOREIGN PATENT DOCUMENTS

| WO | WO 2009/117119 A1 | 9/2009 |
| WO | WO 2014/020137 A1 | 2/2014 |

OTHER PUBLICATIONS

International Preliminmy Report on Patentability directed to related International Patent Application No. PCT/EP2016/080507, dated Jun. 12, 2018; 6 pages.
"Dynabeads Magnetic Separation Technology," ThermoFisher Scientific; 2 pages.
Kothe et al.: "SimpleSTORM: a fast self-calibrating reconstruction algorithm for localization microscopyn," Histochemistry and Cell Biology, Apr. 11, 2014, vol. 141, No. 6, pp. 613-627.
Lammare et al., "Transcriptomic Analysis of the exist form dormancy of Aspergillus fumigatus conidia," BMC Genomics, Biomed Central, Sep. 16, 2008, vol. 9; 15 pages.
Metzker, "Sequencing technologies—the next generation," Nature Reviews Genetics, Jan. 2010, vol. 11, pp. 31-46.
Otsu, "Threshold selection method from gray-level histograms," IEEE Transactions on Systems, Man and Cybernetics, 1997, vol. 9, No. 1, pp. 62-66.
Voelkerding et al., Next-Generation Sequencing: From Basic Research to Diagnostics, Clinical Chemistry, Mar. 2009, vol. 55, No. 4, pp. 641-658.

* cited by examiner

OBJECT CLASSIFICATION IN DIGITAL IMAGES

The present invention relates to systems and methods for distinguishing at least one first object from at least one second object in a plurality of digital images. More particularly, the present invention relates to the classification of live-objects and distinguishing the same from blank-objects, preferably for DNA-sequencing.

Biotechnology, medicine and related technical fields are based on the analysis of molecules. Electronic devices can analyse molecules with high precision and specificity. Especially in last years, automated electronic devices have been developed for analysing large numbers of samples by routine methods. For example, modern DNA sequencing apparatus are used for routine analysis of large numbers of DNA probes. Protein samples can be analysed by high throughput screening and related methods. Frequently, such electronic devices detect fluorescent signals emitted from the sample probes. This is possible when molecules, such as nucleic acids or proteins, have been labelled with fluorescent compounds such as dyes.

Commercially available sequencing apparatus are capable of sequencing large numbers of samples labelled with fluorescent dyes in parallel. Recently developed methods, referred to as "next-generation sequencing", NGS, have revolutionized sequencing. NGS allows the massively parallel sequencing of clonally amplified or single DNA molecules that are spatially separated in a flow cell or by generation of an oil-water emulsion. NGS allows thousands or even millions to billions of sequencing reactions to be preformed simultaneously.

In NGS, sequencing is performed by repeated cycles of polymerase-mediated nucleotide extensions or, in one format, by iterative cycles of oligonucleotide ligation. As a massively parallel process, NGS generates hundreds of megabases to gigabases of nucleotide-sequence output in a single instrument run, depending on the platform. The inexpensive production of large volumes of sequence data is the primary advantage over conventional methods. NGS platforms and common applications/fields for NGS technologies are e.g. reviewed in Voelkerding et al, Clinical Chemistry 55:4 641-658, 2009 and Metzker, Nature Reviews/Genetics Volume 11, January 2010, pages 31-46.

In NGS, various oligonucleotides of interest are covalently attached to a support. Subsequently, a nucleotide labelled with a fluorescent dye is attached to the growing oligonucleotide chain with DNA polymerase. When the four nucleotides are labelled with different fluorescent dyes, fluorescent signals emitted from a probe can be detected and the type of nucleotide attached to the oligonucleotide can be identified. After detection, the fluorescent dye is cleaved off and the next synthesis cycle is carried out, in which a new labelled nucleotide is attached to the growing chain. By carrying out multiple cycles, the sequence of a growing oligonucleotide chain can be determined in a stepwise manner. The working steps are carried out in an automated sequencing apparatus.

US 2010/0323350 A1 and WO 2009/117119 A1 relate to methods and compositions for determining the identity of nucleic acids in nucleotide sequences using, for example, data obtained from sequencing by synthesis methods.

WO 2008/097455 A1 relates to an imaging system for exciting and measuring fluorescence on or in samples comprising fluorescent materials, e.g. fluorescent labels, dyes or pigments, in particular to detect fluorescent labels on nucleic acid. Moreover, a device is disclosed being configured such that fluorescent labels in a plurality of different DNA templates are simultaneously detected.

WO 2014/020137 A1 relates to a method for enriching target sequences from a sequencing library to provide a target enriched sequencing library, wherein the sequencing library is suitable for massive parallel sequencing and comprises a plurality of double-stranded nucleic acid molecules.

Fluorescent signals emitted from sample probes with labelled molecules are weak, but the signals have to be detected with high precision and specificity. Thus, precise optical equipment, especially cameras and scanning technology, is required for such processes.

In addition, extensive evaluation of the digital images captured by an optical imaging system of the sequencing apparatus is necessary for obtaining a precise and reliable result of the sequencing, e.g. in FASTQ.

In DNA/RNA sequencing, the bead/object positions typically are determined in a so-called white-light illuminated, i.e. in broad spectral range, image. On the one hand this procedure is quite robust to determine the positions of the beads, but, on the other hand, this method does not allow distinguishing beads that are populated with DNA, so-called live-beads, from blank-beads that are not bound to any DNA. Thus, the object of the present invention is the determination of the live-beads in order to e.g. allow the assessment of the enrichment, i.e. the ratio between blank- and live-beads of a run.

It is an object of the invention to provide a method and a system, which overcomes the above mentioned problems of the prior art. In particular, one object is to distinguish live-beads from blank-beads.

This object is achieved with the features of the independent claims. The dependent claims relate to further aspects of the invention.

The method according to the present invention is computer-implemented. However, it is understood by the skilled person that there are also other ways of implementing the method according to the present invention.

In one aspect of the present invention a method for distinguishing at least one first object from at least one second object in a plurality of digital images is provided. The at least one first object has received at least one molecule comprising genetic information, the at least one second object has not received a molecule comprising genetic information. The at least one molecule is configured to receive one of a plurality of fluorescent compounds in each of a plurality of cycles. The digital images are determined by an optical imaging system during emission of electromagnetic radiation by the fluorescent compounds, wherein the plurality of digital images comprises a plurality of series of images, each image of a series referring to the emission spectrum of a respective fluorescent compound and wherein the series of images is repeatedly taken for each of the plurality of cycles. The method comprises the following steps, preferably in the following order:

a) determining intensity values from the plurality of digital images for each object;

b) correcting autofluorescence effects by subtracting a predetermined intensity value from the determined intensity values;

c) correcting crosstalk effects caused by overlapping fluorescent spectra of the fluorescent compounds by applying a predetermined crosstalk matrix to the determined intensity values;

d) computing standard deviation values of the corrected intensity values for each object and each of the plurality of cycles and computing a mean value of the standard deviations for each object;

e) normalizing the mean values for each object using a linear transformation;

f) determining classification thresholds from the normalized mean values using a threshold selection method to obtain a binary digital image, wherein the at least one first object is represented by a first intensity value above the corresponding classification threshold and the at least one second object is represented by a second intensity value below the corresponding classification threshold.

Preferably, the method is applied over a defined cycle-range and the range is defined by a start- and end-cycle. It is preferred that this range starts after the "barcodes" ($6^{th}$ cycle) and ends in the $27^{th}$ cycle (zero-based counting).

The object positions are preferably determined from a corresponding white-light image before the method of the present invention is executed. That is, the object positions are predetermined and are known to the system and method according to the present invention.

The at least one first object is preferably one live-bead having received at least one DNA/RNA strand and the at least one second object is preferably one blank-bead not having received a DNA/RNA strand. The DNA/RNA strand is preferably a single stranded DNA/RNA fragment. Such beads are commercially available e.g. from Thermo Fisher Scientific Inc., e.g. under the brand Dynabeads, see reference [1].

Preferably each DNA strand is configured to receive molecules, preferably nucleotides. The nucleotides preferably comprise one cleavable fluorescent compound and a cleavable cap. It is further preferred that the molecules are a plurality of four different molecules each having a fluorescent compound specific for each of the four different molecules.

Each of the plurality of cycles is preferably characterized in that one of the four molecules is attached to one of the DNA strands, wherein the cleavable cap ensures that only one molecule is attached to one DNA strand during one cycle.

It is preferred that for each cycle a plurality, preferably four, pictures are taken, one for each of the four fluorescent compounds attached to the molecules. It is further preferred that the four fluorescent compounds have one of a main emission spectra in the red, blue, yellow or green spectral regime.

After each of the cycle, the cleavable cap is removed so that another molecule can be attached to the DNA strand in the next cycle.

The optical imaging system preferably comprises of an illumination device, e.g. an LED, to activate/stimulate the fluorescent compound(s) to excite electromagnetic radiation and a detection system, e.g. a CCD detector, to detect the emission spectra (electromagnetic radiation) of the fluorescent compound(s).

The method preferably further comprises before step a): determining minimum intensity values within a plurality of predetermined areas of each of the digital images and correcting the illumination caused by the optical imaging system for each object in each of the digital images by dividing the determined intensity values by the corresponding minimum intensity values.

Preferably, the method further comprises applying a median filter to the determined minimum intensity values of the predetermined areas and/or applying a Gaussian filter to the determined minimum intensity values of the predetermined areas, preferably after applying the median filter.

The predetermined areas are preferably of a smaller number than the number of pixel of the original image, i.e. smaller than the original image size.

The method preferably further comprises interpolating the determined minimum intensity values of the predetermined areas to the original digital image size, preferably by the use of a bicubic interpolation. However, any suitable interpolation method might be preferably applied in order to determine the minimum intensity values of the predetermined areas to the original digital image size.

The predetermined intensity value for correcting the autofluorescence effects is preferably determined by taking a predetermined smallest intensity value from the determined intensities, preferably by taking the 10% smallest intensity value from the determined intensities.

The crosstalk matrix preferably accounts for an overlap of a green fluorescent spectrum with a yellow fluorescent spectrum of the fluorescent compounds, preferably by applying a factor of 0.4. That is, the crosstalk matrix preferably comprises of only one factor, i.e. to correct for the overlapping spectra of green and yellow. Whereas, the other entries of the crosstalk matrix are preferably zero, i.e. no correction is done to the other spectra.

Normalizing the mean values preferably comprises subdividing the determined mean values into a plurality of groups and determining minimum mean values and maximum mean values for each group.

The method preferably further comprises applying a region growing approach to the minimum values and the maximum values and/or applying a median filter to the minimum values and the maximum values and/or applying a Gaussian filter to the minimum values and the maximum values.

The values according to the present invention are preferably represented in a corresponding matrix. If one of the matrix elements is empty, a region growing approach applied, e.g. to the minimum values (minimum matrix) and/or the maximum values (maximum matrix), since it is preferred to avoid empty elements within the respective matrices.

The method preferably comprises interpolating the determined minimum values and maximum values to the original digital image size, preferably by the use of a bicubic interpolation. However, any interpolation method can be used just as well.

A linear transformation is preferably performed for each object by dividing the differences between the mean values and the corresponding minimum values by the corresponding differences between the maximum values and the corresponding minimum values.

The method preferably further comprises subdividing the normalized mean values in a predetermined number of subgroups and determining corresponding mean values of objects for each subgroup before determining the classification thresholds for each subgroup, and preferably subsequently applying a region growing approach and/or a median filter and/or a Gaussian filter.

The threshold selection method preferably comprises the Otsu segmentation method, preferably applied to the determined mean values of the subgroups.

The method preferably further comprises interpolating the thresholds determined by the threshold selection method to the original digital image size, preferably by the use of a bicubic interpolation. The determination of classification thresholds from the normalized mean values using a threshold selection method to obtain a binary digital image is used to classify the two different objects, i.e. the first and second objects. That is, in the binary image, the at least one first object is represented by a first intensity value above the corresponding classification threshold and the at least one second object is represented by a second intensity value below the corresponding classification threshold.

The invention also relates to a system for distinguishing at least one first object from at least one second object in a plurality of digital images The at least one first object having received at least one molecule comprising genetic information, the at least one second object not having received a molecule comprising genetic information. The at least one molecule is configured to receive one of a plurality of fluorescent compounds in each of a plurality of cycles. The digital images is determined by an optical imaging system during emission of electromagnetic radiation by the fluorescent compounds, wherein the plurality of digital images comprises a plurality of series of images, each image of a series referring to the emission spectrum of a respective fluorescent compound and wherein the series of images is repeatedly taken for each of the plurality of cycles. It is preferred that the system is configured to carry out the steps of the method outlined above. The system comprises an intensity determining unit configured to obtain intensity values from the plurality of digital images for each object, a correction unit configured to correct autofluorescence effects by subtracting a predetermined intensity value from the determined intensity values and to correct crosstalk effects caused by overlapping fluorescent spectra by applying a predetermined crosstalk matrix to the determined intensity values, and a computation unit configured to compute standard deviation values of the corrected intensity values for each object and each of the plurality of cycles and computing mean values of the standard deviations for each object and to compute normalized mean values for each object using a linear transformation and to compute classification thresholds using a threshold selection method to obtain a binary digital image, wherein the at least one first object is represented by a first intensity value above the corresponding classification threshold and the at least one second object is represented by a second intensity value below the corresponding classification threshold.

In yet another aspect of the present invention a computer program product comprising one or more computer readable media having computer executable instructions for performing the steps of the method outlined above.

Thus, the present invention provides a solution arising from the prior art and to the technical challenges arising from using a threshold selection method, e.g. the Otsu-method, see reference [2], which prevent a reliable and robust identification of a classification threshold, e.g. inhomogeneous image brightness/saturation caused by a vignetting effect due to the optical system and uneven illumination and different intensity levels and autofluorescence characteristics between channels.

Some preferred embodiments are now described with reference to the drawings. For explanation purpose, various specific details are set forth, without departing from the scope of the present invention as claimed.

Figure 1:
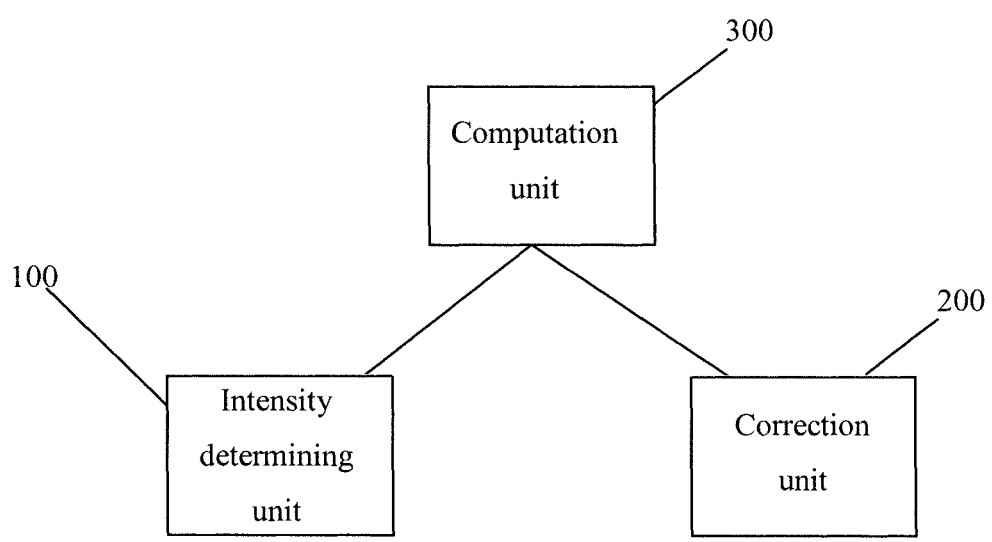
FIG. 1 illustrates a system according to one embodiment of the present invention.

FIG. 1 illustrates a system according to the present invention. The system comprises a determining unit 100, a correction unit 200 and a computational unit 300. All of these units are configured to execute one or more of the steps of the present invention. While the present invention is described using three independent units 100, 200, 300, it is apparent that the independent units can also be part of one single unit as long as the steps of the present invention are executed.

In a preferred embodiment of the present invention the intensity determining unit 100 is configured to obtain intensity values from the plurality of digital images for each object. It is also possible that the intensity determining unit 100 is configured to determine all intensity values from the plurality of images. However, this might lead to longer processing times.

The intensity determining unit 100 might obtain the object positions from a white light image determined beforehand. Thus, it is assumed that the object positions within the images are known for extracting the intensity values for each object only.

The correction unit 200 is configured to correct autofluorescence effects by subtracting a predetermined intensity value from the determined intensity values and to correct crosstalk effects caused by overlapping fluorescent spectra by applying a predetermined crosstalk matrix to the determined intensity values.

The computation unit 300 is configured to compute standard deviation values of the corrected intensity values for each object and each of the plurality of cycles and computing mean values of the standard deviations for each object and to compute normalized mean values for each object using a linear transformation and to compute classification thresholds using a threshold selection method to obtain a binary digital image, wherein the at least one first object is represented by a first intensity value above the corresponding classification threshold and the at least one second object is represented by a second intensity value below the corresponding classification threshold.

The functionality of the intensity determining unit 100, the correction unit 200 and the computation unit 300 will be further described in terms of method steps in the following preferred embodiments of the present invention. It is obvious for a person skilled in the art that the following description of method steps gives rise to corresponding functions of the intensity determining unit 100, the correction unit 200 and the computation unit 300.

Figure 2A:
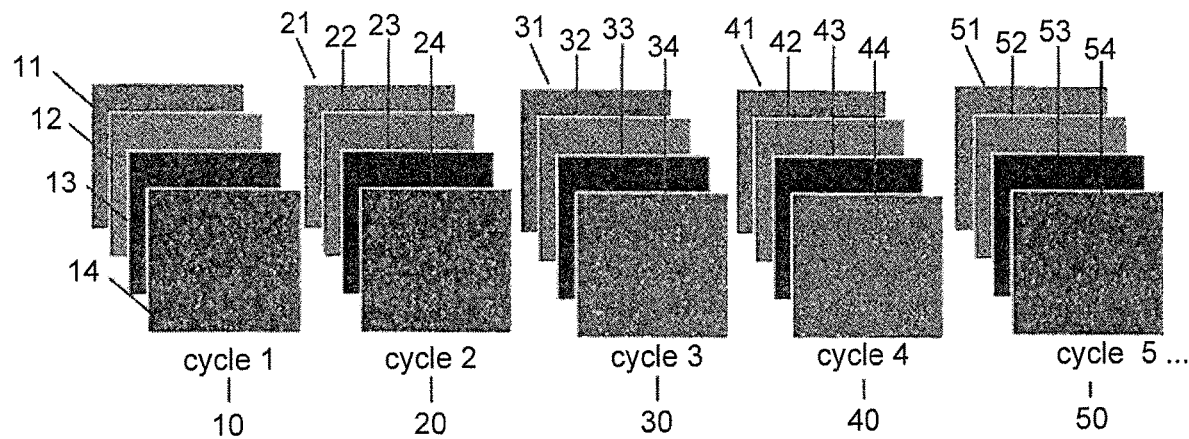
FIG. 2a illustrates the images taken in different cycles according to an embodiment of the present invention.

FIG. 2a illustrates the images 11-14, 21-24, 31-34, 41-44, 51-54 taken in a plurality of cycles 10-50. This illustration should not be construed as limiting as of the amount of images taken in a corresponding cycle or the amounts of cycles. As can be seen in FIG. 2a in each of the cycles 10-50 four images 11-14, 21-24, 31-34, 41-44, 51-54 are taken, i.e. acquired, captured etc., in this example. In particular, each of the four images 11-14, 21-24, 31-34, 41-44, 51-54 in one cycle 10-50 corresponds to one channel of the optical imaging system, i.e. red, green, yellow and blue. The different colors are emitted by fluorescent compounds carried by different molecules which are received by DNA strands attached to the objects (beads). More particular, each of the different fluorescent compounds represents one of a specific DNA base, i.e. thymine (T), adenine (A), cytosine (C), and guanine (G). For example, the fluorescent compounds are associated to the DNA bases as follows: T=green; A=yellow; C=blue; and G=red.

In each cycle 10-50 the first images 11, 21, 31, 41, 51 corresponds to one of the four channels T, A, C, G, e.g. G. The second images 12, 22, 32, 42, 52 then correspond to a second one of the remaining three channels T, A, C, e.g. C. The third images 13, 23, 33, 43, 53 then correspond to a third one of the remaining two channels T, A, e.g. A. The fourth images 14, 24, 34, 44, 54 then correspond to a fourth one of the remaining channel, e.g. T.

Figure 2B:
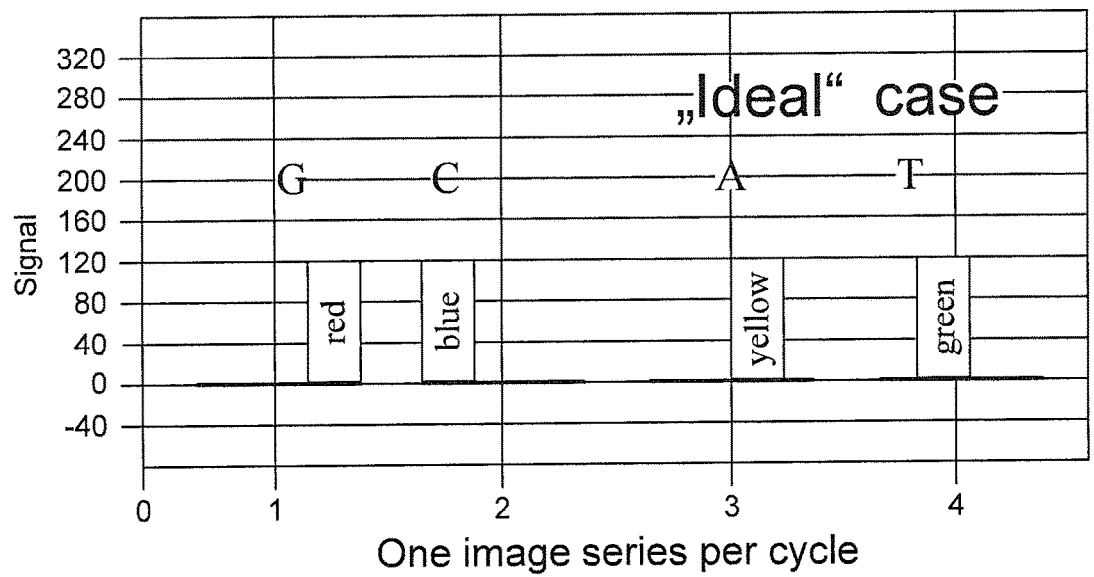
FIG. 2b illustrates an ideal signal of the different channels.

FIG. 2b shows the signal strength determined from four cycles for one bead. Each of the cycles comprises four images, wherein FIG. 2b illustrates the signal strength for the respective channels G, C, A, T, i.e. the base call for that specific cycle. That is, in an ideal case each channel would provide a single signal for each channel. However, due to different parasitic effects, like autofluorescence effects and crosstalk effects between different channels, the signals for the different channels are most likely to be different from the ideal case.

In the following one exemplary embodiment of the method according to the present invention is outlined.

First a correction of the extracted intensities for each cycle 10-50 is done. This step is a pre-processing step for the upcoming computation of the classification feature. This step mainly consists of illumination correction, autoflorescence correction, and crosstalk correction.

The correction of the illumination in each fluorescence image 11-14, 21-24, 31-34, 41-44, 51-54 is to compensate the uneven illumination (equilibration of illumination) and comprises the steps of subdividing the corresponding fluorescence images 11-14, 21-24, 31-34, 41-44, 51-54 into several sub-tiles and determine the minimum intensity value of each sub-tile (predetermined areas). The subdivision of the image, typically $128^2$ pixels per sub-tile, is done to cope with vignetting effects by a more local processing. Next, in order to eliminate possible extreme values in the resulting minimum matrix a median filtering (3×3) is applied (outlier removal, e.g. dead-pixels, etc.). Furthermore, to smooth the surface of the minimum matrix a Gaussian filter is applied to the resulting matrix. The smoothing is applied in order to prevent/reduce discontinuities in the enlarged image.

The goal is to have a corresponding minimum value for each bead (bead-position). Therefore, the minimum matrix, e.g. 26×20, is enlarged by bicubic interpolation to the typical image size of e.g. 3296×2472 pixels.

For each bead (ignoring so-called edge- and lost beads), the illumination correction is done by dividing the extracted intensity by the corresponding minimum value of the previous step.

The above steps for the illumination correction are not essential to the present invention and can be omitted, e.g. if the illumination is essentially uniform over the respective image.

Figure 3:
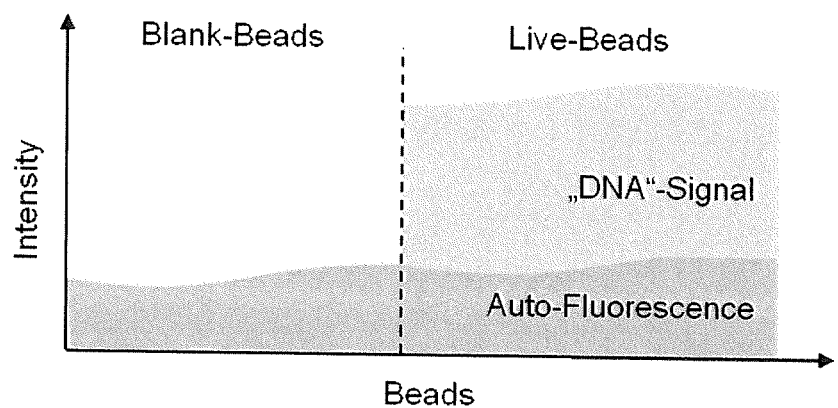
FIG. 3 illustrates autofluorescence effects.

Next, a subtraction of the autofluorescence from the illumination corrected intensity is done. In FIG. 3 typical intensity levels for live-beads and blank-beads with the presence of autofluorescence are illustrated. That is, the illumination corrected intensities still contain the autofluorescence intensity of the beads. Because of the different autofluorescence characteristics between the channels the autofluorescence has to be removed in order to allow the computation of reliable classification features.

In order to account for the parasitic autofluorescence signal, the autofluorescence value is determined by taking a predetermined value, e.g. by taking the 10% smallest illumination corrected intensity value. The autofluorescence typically is extracted from blank-beads, which are not populated with DNA. Since it is obvious that there is no blank/live classification result until the classification method of the present invention has finished, the autofluorescence intensity is approximated as described before.

Figure 4:
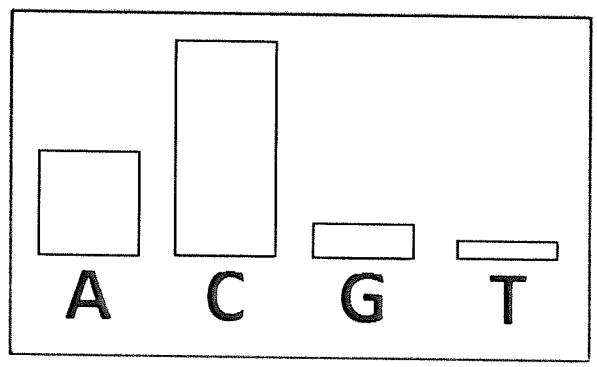
FIG. 4 illustrates crosstalk effects between the different channels.

Another parasitic effect is the so-called crosstalk between the different channels A, C, G, T. FIG. 4 illustrates an exemplary crosstalk effect. In comparison to the ideal case illustrated by FIG. 2b, not only the main signal has a value different from zero but also the other channels show non-zero values, due to overlapping fluorescent spectra. That is, due to an overlap in the dye (fluorescent compound) emission frequencies an interdependency between pairs of color channels can be observed (crosstalk). Consequently, bead intensities of one cycle 10-50 are inherently biased. The correction of the crosstalk in the autofluorescence corrected intensities is done by using a rough estimation of the crosstalk matrix, e.g. a factor from channel T into A is 0.4, all other factors zero.

After the correction of the illumination and correction of parasitic effects, computation of standard deviations of the corrected intensities over channels for each bead and cycle 10-50 is done. The assumption is that blank-beads have a low standard deviation (in ideal case 0) and live-beads have a high standard deviation. The standard deviations are stored for the subsequent live classification, i.e. one standard deviation value for each bead and cycle 10-50 of the cycle-range.

Figure 5:
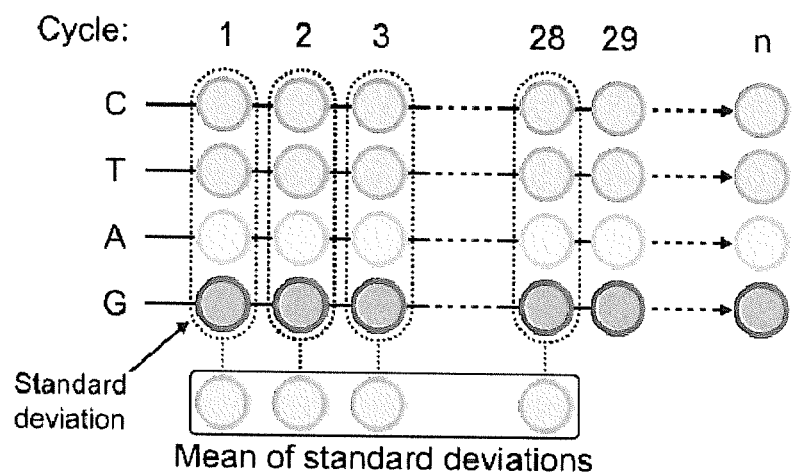
FIG. 5 illustrates the computation of standard deviation values for each cycle and a corresponding mean value for the cycles according to an embodiment of the present invention.

Next, the mean value of the standard deviations of a cycle 10-50 is computed as a classification feature for each bead. The basic concept of the computation of standard deviation values and the corresponding mean value is illustrated in FIG. 5, where the different channels are shown for a specific bead position and a specific cycle. The standard deviation is then calculated from the different channels for a specific bead position and a specific cycle. The obtained standard deviation values for all cycles are then used to calculate a mean value for a specific bead position for the plurality of cycles. Thus, a mean value represents one bead position, preferably live-bead position, in each cycle.

Next a normalization of the classification features, to allow the determination of proper classification thresholds, is done. That is, a transformation of the classification features into the interval [0,1] (common linear transformation) is done. For this, the classification features are subdivided into several blocks (groups) based on the corresponding bead-positions and determine the minimum and maximum features values in each block. Doing so, this procedure results in two matrices, i.e. a minimum matrix and a maximum matrix.

In case the two matrices comprise empty elements the min/max matrices can be filled by a region growing approach, for stability purposes.

To eliminate possible extreme values in the resulting min/max matrices a median filter (e.g. 3×3) might be applied. To smooth the surface of the min/max matrices a Gaussian filter might be applied.

Upscaling of the two matrices to the original size of the source images is applied next, so that each pixel has a corresponding minimum and maximum feature value. Finally, a normalization of each pixel value v(x, y) is done by a common linear transformation $$\hat{v}(x, y) = \frac{v(x, y) - \min(x, y)}{\max(x, y) - \min(x, y)},$$

where $\hat{v}(x, y)$ is the normalized pixel value.

Figure 6:
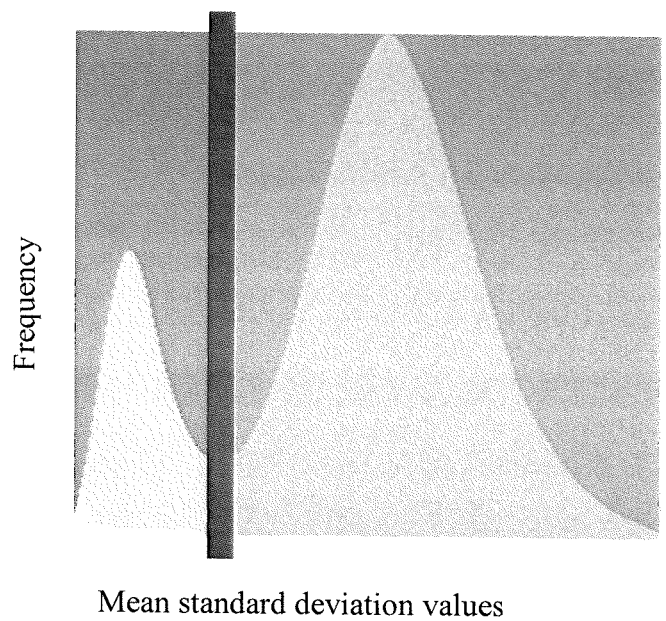
FIG. 6 illustrates a threshold selection method according to an embodiment of the present invention.

Next, a determination of classification thresholds, e.g. by using the Otsu segmentation method, see reference [1], is done. First, the normalized surface is subdivided into several sub-tiles (subgroups) and the corresponding feature values on the bead positions for each sub-tile are extracted. Second, based on the extracted feature values, in each sub-tile apply a clustering-based image thresholding method (e.g. [1]) to determine the threshold which distinguishes live-beads from blank-beads. The rationale of the Otsu method is that the algorithm assumes that an image consists of two classes of pixels (foreground and background pixels), thus assumes a bi-modal histogram. The threshold is then calculated by finding the optimal threshold which separated the two classes of pixels. An optimized threshold determined by the Otsu method is illustrated by FIG. 6, wherein the line illustrates an optimal threshold.

For stability purposes, empty elements of the achieved threshold matrix of the previous step might be filled by a region growing approach, if necessary.

Next, the threshold matrix is upscaled to the original image size by applying a median filter, a Gaussian filter with subsequently upscaling the threshold matrix to the original image size as described above.

Having a threshold image, this image now is used to distinguish between live- and blank-beads in the normalized image, where bright pixels are corresponding to live-beads. In case of live-beads (marked as bright pixels) the corresponding normalized value of the bead is larger than the corresponding threshold. Thus, the final binary map is used to determine and to finally set the status of each bead whether it is live or blank.

The forgoing method steps of the preferred embodiment have been described as relating to DNA/RNA sequencing. However, as will be apparent to the person skilled in the art the present invention is not restricted to this field. It is clear that the solution of the present invention can be applied to numerous other technical fields, where fluorescent images comprising different types of objects are analyzed. That is, the objects do not have to be beads, but can also be any kind of fluorescent emitting objects.

As the present invention may be embodied in several forms without departing from the scope or essential characteristics thereof, it should be understood that the above-described embodiments are not limited by any of the details of the foregoing descriptions, unless otherwise specified, but rather should be construed broadly within the scope as defined in the appended claims, and therefore all changes and modifications that fall within the present invention are therefore intended to be embraced by the appended claims.

Furthermore, in the claims the word "comprising" does not exclude other elements or steps, and the indefinite article "a" or "an" does not exclude a plurality. A single unit may fulfil the functions of several features recited in the claims. The terms "essentially", "about", "approximately" and the like in connection with an attribute or a value particularly also define exactly the attribute or exactly the value, respectively. References:

[1]-https://www.theimofisher.com/de/de/home/brands/product-brand/dynal.html,

[2]-Otsu,N, "Threshold selection method from gray-level histograms", IEEE Transactions on Systems, Man and Cybernetics, 1997, number 1, volume 9, pages 62-66.

The invention claimed is:

1. A computer implemented method for distinguishing at least one first object from at least one second object in a plurality of digital images wherein the method comprises:
    determining intensity values from the plurality of digital images for each object, wherein the at least one first object having received at least one molecule comprising genetic information, the at least one second object having not received a molecule comprising genetic information, wherein the at least one molecule is configured to receive one of a plurality of fluorescent compounds in each of a plurality of cycles, the plurality of digital images being determined by an optical imaging system during emission of electromagnetic radiation by the fluorescent compounds, wherein the plurality of digital images comprise a plurality of series of images, each image of a series of images referring to an emission spectrum of a respective fluorescent compound, and wherein the series of images is repeatedly taken for each of the plurality of cycles;
    correcting autofluorescence effects of the determined intensity values by subtracting a predetermined intensity value from the determined intensity values;
    correcting crosstalk effects of the determined intensity values, caused by overlapping fluorescent spectra of the fluorescent compounds, by applying a predetermined crosstalk matrix to the determined intensity values;
    computing standard deviation values of the corrected intensity values for each object and each of the plurality of cycles;
    computing a mean value of the standard deviation values for each object;
    normalizing the mean values for each object using a linear transformation; and
    determining classification thresholds from the normalized mean values using a threshold selection method to obtain a binary digital image, wherein the at least one first object is represented by a first intensity value above the corresponding classification threshold and the at least one second object is represented by a second intensity value below the corresponding classification threshold.

2. The method according to claim 1, further comprising:
    determining minimum intensity values within a plurality of predetermined areas of each of the digital images; and
    correcting illumination caused by the optical imaging system for each object in each of the digital images by dividing the determined intensity values by the corresponding minimum intensity values.

3. The method according to claim 2, further comprising:
    applying a median filter to the determined minimum intensity values of the predetermined areas; and
    applying a Gaussian filter to the determined minimum intensity values of the predetermined areas after applying the median filter.

4. The method according to claim 2, further comprising:
    interpolating the determined minimum intensity values of the predetermined areas to an original digital image size using a bicubic interpolation.

5. The method according to claim 1, wherein the predetermined intensity value for correcting the autofluorescence effects is determined by taking a predetermined smallest intensity value from the determined intensity values, by taking the 10% smallest intensity value from the determined intensity values.

6. The method according to claim 1, wherein the crosstalk matrix accounts for an overlap of a green fluorescent spectrum with a yellow fluorescent spectrum of the fluorescent compounds by applying a factor of 0.4.

7. The method according to claim 1, wherein normalizing the mean values comprises:
subdividing the mean values into a plurality of groups; and
determining minimum mean values and maximum mean values for each group.

8. The method according to claim 7, further comprising:
applying a region growing approach to the minimum mean values and the maximum mean values,
or a median filter to the minimum mean values and the maximum mean values,
or a Gaussian filter to the minimum mean values and the maximum mean values.

9. The method according to claim 7, further comprising:
interpolating the minimum mean values and the maximum mean values to an original digital image size using a bicubic interpolation.

10. The method according to claim 7, wherein the linear transformation is performed for each object by dividing differences between the mean values and the corresponding minimum mean values by the corresponding differences between the maximum mean values and the corresponding mean minimum values.

11. The method according to claim 1, further comprising:
subdividing the normalized mean values in a predetermined number of subgroups;
determining corresponding mean values for each subgroup before determining the classification thresholds; and
applying a region growing approach, a median filter, or a Gaussian filter to the determined mean values of the subgroups.

12. The method according to claim 11, further comprising: interpolating the thresholds determined by the threshold selection method to an original digital image size using a bicubic interpolation.

13. The method according to claim 1, wherein the threshold selection method comprises an Otsu segmentation method applied to the determined mean values of the subgroups.

14. A system for distinguishing at least one first object from at least one second object in a plurality of digital images, wherein the system comprises:
an intensity determining unit configured to determine intensity values from the plurality of digital images for each object, wherein the at least one first object having received at least one molecule comprising genetic information, the at least one second object having not received a molecule comprising genetic information, wherein the at least one molecule is configured to receive one of a plurality of fluorescent compounds in each of a plurality of cycles, the plurality of digital images being determined by an optical imaging system during emission of electromagnetic radiation by the fluorescent compounds, wherein the plurality of digital images comprises a plurality of series of images, each image of a series of images referring to an emission spectrum of a respective fluorescent compound, and wherein the series of images is repeatedly taken for each of the plurality of cycles;

a correction unit configured to:
correct autofluorescence effects of the determined intensity values by subtracting a predetermined intensity value from the determined intensity values; and
correct crosstalk effects of the determined intensity values, caused by overlapping fluorescent spectra, by applying a predetermined crosstalk matrix to the determined intensity values; and
a computation unit configured to:
compute standard deviation values of the corrected intensity values for each object and each of the plurality of cycles,
compute mean values of the standard deviations for each object;
compute normalized mean values for each object using a linear transformation; and
compute classification thresholds using a threshold selection method to obtain a binary digital image, wherein the at least one first object is represented by a first intensity value above the corresponding classification threshold and the at least one second object is represented by a second intensity value below the corresponding classification threshold.

15. The system according to claim 14, wherein the computation unit is further configured to:
determine minimum intensity values within a plurality of predetermined areas of each of the digital images; and
correct illumination caused by the optical imaging system for each object in each of the digital images by dividing the determined intensity values by the corresponding minimum intensity values.

16. The system according to claim 15, wherein the computation unit is further configured to: apply a median filter to the determined minimum intensity values of the predetermined areas; and applying a Gaussian filter to the determined minimum intensity values of the predetermined areas after applying the median filter.

17. The system according to claim 15, wherein the computation unit is further configured to: interpolate the determined minimum intensity values of the predetermined areas to an original digital image size using a bicubic interpolation.

18. A non-transitory computer readable media having instructions stored thereon that, when executed by at least one computing device, cause the at least one computing device to perform operations comprising: determining intensity values from a plurality of digital images for each object, wherein at least one first object having received at least one molecule comprising genetic information, at least one second object having not received a molecule comprising genetic information, wherein the at least one molecule is configured to receive one of a plurality of fluorescent compounds in each of a plurality of cycles, the plurality of digital images being determined by an optical imaging system during emission of electromagnetic radiation by the fluorescent compounds, wherein the plurality of digital images comprise a plurality of series of images, each image of a series of images referring to an emission spectrum of a respective fluorescent compound, and wherein the series of images is repeatedly taken for each of the plurality of cycles; correcting autofluorescence effects of the determined intensity values by subtracting a predetermined intensity value from the determined intensity values; correcting crosstalk effects of the determined intensity values, caused by overlapping fluorescent spectra of the fluorescent compounds, by applying a predetermined crosstalk matrix to the determined intensity values; computing standard deviation values of the corrected intensity values for each object and each of the plurality of cycles; computing a mean value of the standard deviations for each object; normalizing the mean values for each object using a linear transformation; and determining classification thresholds from the normalized mean values using a threshold selection method to obtain a binary digital image, wherein the at least one first object is represented by a first intensity value above the corresponding classification threshold and the at least one second object is represented by a second intensity value below the corresponding classification threshold.

19. The non-transitory computer readable media according to claim 18, wherein the operations further comprise: determining minimum intensity values within a plurality of predetermined areas of each of the digital images; and correcting illumination caused by the optical imaging system for each object in each of the digital images by dividing the determined intensity values by the corresponding minimum intensity values.

20. The non-transitory computer readable media according to claim 19, wherein the operations further comprise: applying a median filter to the determined minimum intensity values of the predetermined areas; and applying a Gaussian filter to the determined minimum intensity values of the predetermined areas-after applying the median filter.

* * * * *